US008276612B2

(12) United States Patent
Folk

(10) Patent No.: US 8,276,612 B2
(45) Date of Patent: Oct. 2, 2012

(54) SYSTEM AND METHOD FOR HYDRAULICALLY MANAGING FLUID PRESSURE DOWNSTREAM FROM A MAIN VALVE

(75) Inventor: Robert Folk, Costa Mesa, CA (US)

(73) Assignee: CLA-VAL, Co., Costa Mesa, CA (US)

( * ) Notice: Subject to any disclaimer, the term of this patent is extended or adjusted under 35 U.S.C. 154(b) by 0 days.

(21) Appl. No.: 13/240,077

(22) Filed: Sep. 22, 2011

(65) Prior Publication Data

US 2012/0006418 A1    Jan. 12, 2012

Related U.S. Application Data

(60) Division of application No. 12/062,946, filed on Apr. 4, 2008, now abandoned, which is a continuation-in-part of application No. 11/927,474, filed on Oct. 29, 2007, now Pat. No. 8,091,582.

(60) Provisional application No. 60/911,604, filed on Apr. 13, 2007.

(51) Int. Cl.
F16K 31/12 (2006.01)
F16K 31/36 (2006.01)

(52) U.S. Cl. ............... 137/505.14; 137/489; 137/505.44

(58) Field of Classification Search .................. 137/488, 137/489, 12, 14, 485, 486, 565.14, 49, 50, 137/51, 505.14, 505.44, 495; 251/12, 14, 251/25, 28, 35, 94, 75
See application file for complete search history.

(56) References Cited

U.S. PATENT DOCUMENTS

| 2,230,914 | A | 2/1941 | Sherman |
| 2,235,304 | A | 3/1941 | Toussaint |
| 2,399,938 | A | 6/1944 | Pett |
| 2,536,184 | A | 1/1951 | Johnson |
| 2,543,846 | A | 3/1951 | Griswold |
| 2,599,534 | A | 6/1952 | Annin |
| 2,991,796 | A | 7/1961 | Griswold |
| 3,125,319 | A | 3/1964 | Arbogast et al. |
| 3,136,333 | A | 6/1964 | Griswold |
| 3,168,901 | A | 2/1965 | Murakami |
| 3,185,344 | A | 5/1965 | Kenney |
| 3,302,531 | A | 2/1967 | Arbogast et al. |
| 3,428,063 | A | 2/1969 | Plotkin et al. |
| 3,592,223 | A | 7/1971 | Reese |
| 3,669,143 | A | 6/1972 | Reese |
| 3,875,957 | A | 4/1975 | Veit et al. |
| 4,143,850 | A | 3/1979 | Brakebill |

(Continued)

FOREIGN PATENT DOCUMENTS

EP    0321774 A2    6/1989

(Continued)

*Primary Examiner* — John Rivell
*Assistant Examiner* — Hailey K Do
(74) *Attorney, Agent, or Firm* — Kelly & Kelley, LLP

(57) ABSTRACT

A system and method for controlling fluid pressure downstream a main valve includes associating a variable orifice with the main valve such that the variable orifice opens as the main valve is opened and closes as the main valve is closed. A fluid stream taken from a fluid inlet of the main valve is passed to an inlet of the variable orifice. A fixed orifice is in fluid communication with an outlet of the variable orifice. A pressure differential between the inlet and outlet of a fixed orifice is detected by a control pilot device, which hydraulically opens or closes the main valve in response to the detected fixed orifice pressure differential between low pressure and high pressure set points.

5 Claims, 12 Drawing Sheets

U.S. PATENT DOCUMENTS

| | | | |
|---|---|---|---|
| 4,553,732 A | 11/1985 | Brundage et al. |
| 4,565,349 A | 1/1986 | Tomlin |
| 4,697,616 A | 10/1987 | Ashcroft |
| 5,183,074 A | 2/1993 | Reese |
| 5,348,036 A | 9/1994 | Oksanen et al. |
| 5,393,035 A | 2/1995 | Steele |
| 5,460,196 A | 10/1995 | Yonnet |
| 5,555,910 A | 9/1996 | Powell et al. |
| 5,816,286 A | 10/1998 | Scott et al. |
| 5,967,176 A | 10/1999 | Blann et al. |
| 6,056,008 A | 5/2000 | Adams et al. |
| 6,354,319 B1 | 3/2002 | Mooney |
| 6,595,237 B2 | 7/2003 | Cecchinato et al. |
| 6,752,169 B2 | 6/2004 | Callies |
| 7,066,710 B2 | 6/2006 | Wiggins et al. |
| 2003/0111627 A1 | 6/2003 | Winslow |

FOREIGN PATENT DOCUMENTS

| | | |
|---|---|---|
| GB | 2166567 A | 5/1986 |

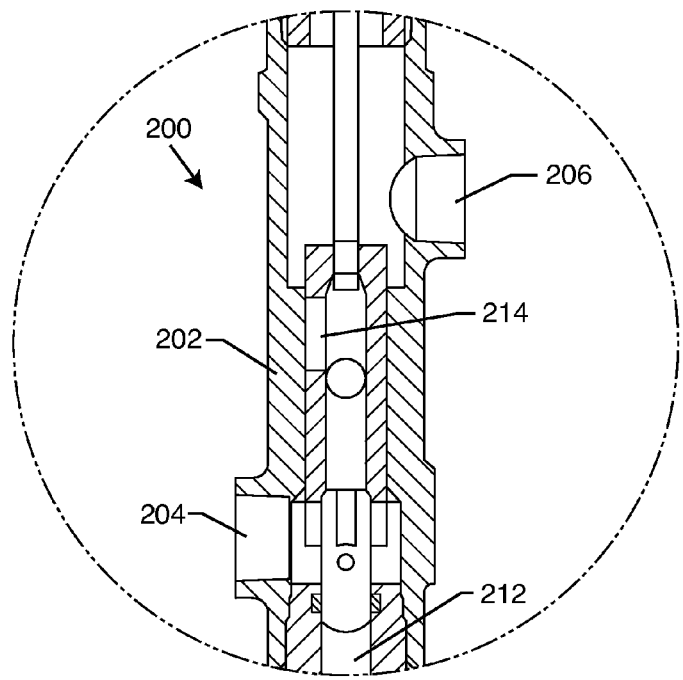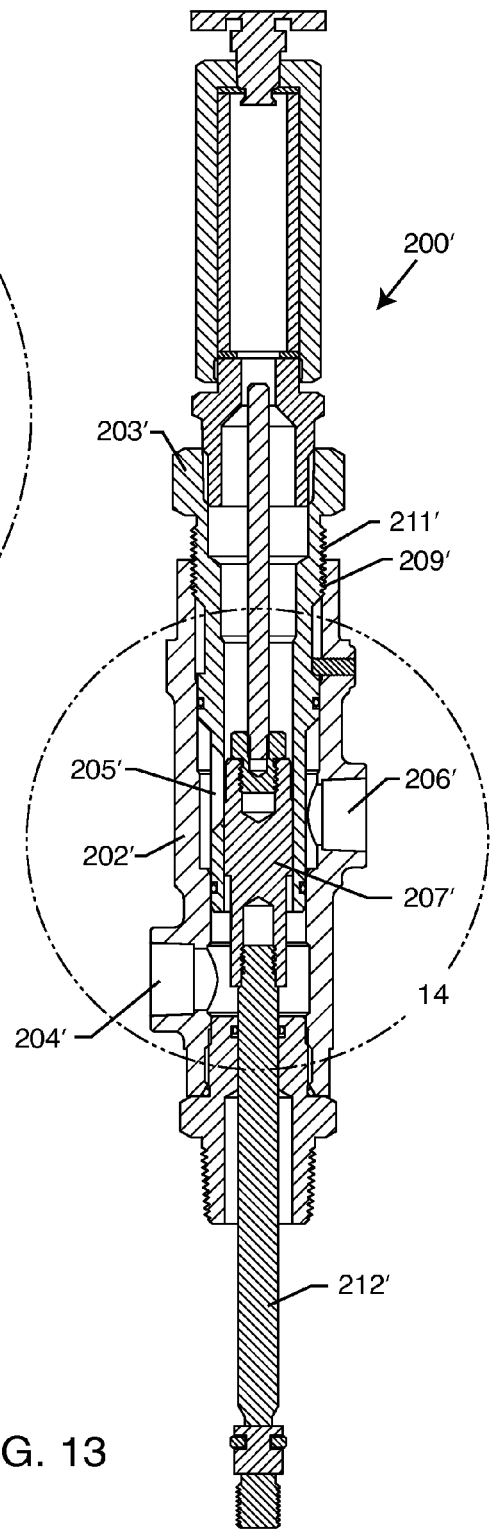
FIG. 12
FIG. 13

SYSTEM AND METHOD FOR HYDRAULICALLY MANAGING FLUID PRESSURE DOWNSTREAM FROM A MAIN VALVE

BACKGROUND OF THE INVENTION

The present invention generally relates to automatic valves, such as those employed on municipal water utility systems. More particularly, the present invention relates to a hydraulically adjustable pressure management control valve designed to control pressure downstream of a main valve.

There is a general understanding throughout the worldwide water supply industry that instances of water loss are common in many water distribution networks and in many instances the level of water loss can be relatively high. The amount of water loss in the system is due to a variety of leak sources, such as improperly tightened pipe flange connections, leaking flange gaskets, leaking valve seals, failed seals, old pipes (with pinhole bursts), loose fittings, leaky faucets, etc. The sum of these sources of leakage can add up to a substantial amount of water loss. Maintaining the entry point pressure at all times at the level necessary to provide adequate pressure at the distant points for periods of high demand can result, during periods of low demand, in excessive pressure at the consumer's premises, and thus increased waste of water by unnecessary consumption and leakage. The volume of water lost through leakage is directly related to pressure in the system.

Automatic pressure reducing valves are used in water distribution systems to reduce pressure to a pre-determined value or sub-point that is adequate, but does not expose normal components, such as household hot water tanks, to over-pressure. The sub-point is typically determined to provide minimum pressure that meets criteria of the water utility, particularly under maximum or "peak" demand conditions which can occur when a fire is being fought. The pressure required for peak demand is usually significantly higher than that required for "off-peak" or typical nighttime conditions. Under low demand conditions, not only does leakage form a higher proportion of the total demand, but investigation has implied that some leak orifices can actually increase in area with pressure, aggravating the problem if excessive pressures are maintained at all times.

Various attempts have been previously made to reduce such losses by introducing a degree of control over the supply pressure in response to demand. One known system uses electrical circuit means with pressure and flow-rate sensors from monitoring pressure and flow-rate and then processing the information obtained and using it in turn to control suitable electrically operated valve means. Such systems are, however, relatively complex and expensive and require a continuous external power supply giving rise to additional capital and running costs and reliability problems.

There also exist flow-driven valves which use fluid pressures to control actuation of the main valve, and thus are independent of external power sources and can be used in essentially any location. One such flow-driven valve system is disclosed in U.S. Pat. No. 5,967,176 to Blann, et al. The system controls high and low pressures by utilizing the pressure drop across an orifice plate that is installed in the main line, usually attached directly to the inlet or outlet flange of the main valve. The pressure control is independent of the main valve position, and is a direct function of system flow. The pressure control device monitors the pressure drop or flow across the orifice plate. Control pressure is varied based upon the movement of a pilot valve member with respect to a fixed pilot valve member, which in turn controls the main control valve.

However, this system has many shortcomings. The diameter of the orifice plate may need to be customized for different high/low flow applications. For example, a smaller orifice diameter may be required if flows are not sufficient to develop the required pressure drop across the system orifice. Likewise, the system orifice may need to be increased if pressure drops are too large because a smaller orifice can limit the flow capacity of the system. The orifice plate also decreases the capacity of the main valve. This is particularly a concern when high flow is necessary, such as a high flow of water to fight a fire or the like. The added orifice plate limits the capacity of the main valve for fire flow situations. Moreover, it is difficult to retrofit existing valves with this system as the flange spacing must be modified to accommodate the orifice plate, typically requiring removal of the main valve from the line.

Accordingly, there is a continuing need for an improved flow-driven valve system for automatically controlling downstream pressure between selected set points. The present invention fulfills these needs and provides other related advantages.

SUMMARY OF THE INVENTION

The present invention resides in a system and method for hydraulically managing fluid pressure downstream a main valve. As will be more fully described herein, the system is flow-driven and responds to changing flow demand downstream from a main valve, so as to manage and control the fluid pressure downstream from the main valve between pre-determined set points.

The system generally comprises a main valve having a main valve body defining a fluid inlet and a fluid outlet. A main valve seat is disposed between the fluid inlet and the fluid outlet. A main valve member is movable between an open position away from the main valve seat, and a closed position engaging the main valve seat. The main valve is configured to hydraulically open to increase fluid flow therethrough, and hydraulically close to reduce fluid flow therethrough. A main valve diaphragm is coupled to the main valve member. The main valve diaphragm and the main valve body, or a cover thereof, define a control chamber having a control port in fluid communication with a pilot control device.

A variable orifice assembly is coupled to the main valve so as to open a variable orifice thereof as the main valve is opened, and close the variable orifice as the main valve is closed. A fixed orifice is in fluid communication with an outlet of the variable orifice. A control device is operably associated with the main valve, an inlet of the fixed orifice and an outlet of the fixed orifice, and configured to detect pressure differentials between the inlet and the outlet of the fixed orifice and open and close the main valve in response to the detected pressure differentials. The control device is fluidly coupled to the control chamber of the main valve, so as to hydraulically open and close the main valve member.

The variable orifice assembly comprises a housing having a fluid inlet in fluid communication with the main valve inlet. A fluid outlet of the variable orifice assembly is in fluid communication with the fixed orifice and a control device. A stem is slidably disposed within the housing and coupled, or engagable with, the main valve member. The stem and housing cooperatively define the variable orifice between the inlet and outlet of the housing of the variable orifice assembly. A sleeve may be disposed between the stem and the housing, having an aperture therethrough, the sleeve, stem and housing cooperatively forming the variable orifice. The sleeve may be adjustably positioned within the housing to vary the fluid flow from the housing inlet to the housing outlet.

The control device typically comprises a control pilot valve apparatus having a high pressure regulating chamber in fluid communication with the inlet of the main valve as well as the main valve control chamber. The control pilot valve apparatus also has low pressure regulating chambers in fluid communication with the outlet of the variable orifice and the outlet of the fixed orifice. The low pressure regulating chambers are separated by a flexible diaphragm supporting an elongated stem. The high pressure regulating chamber is at least partially defined by a second flexible diaphragm, and includes a fluid flow passageway therethrough. A moveable poppet extends from the second flexible diaphragm and into the fluid flow passageway of the high pressure regulating chamber. The poppet extends into a first end of the atmospheric chamber, and the stem extends into a generally opposite end of the atmospheric chamber.

Depending upon the pressures within the chambers of the control pilot valve apparatus, the stem is moved into engagement with the poppet, or the second flexible diaphragm moves the poppet, to alter the flow through the passageway of the high pressure regulating chamber. This results in an alteration of hydraulic pressure in the control chamber of the main valve so as to open or close the main valve. In a particularly preferred embodiment, an atmospheric chamber is disposed between the high and low pressure regulating chambers.

In a particularly preferred embodiment, the control pilot valve apparatus comprises a housing having a fluid low pressure regulating chamber disposed therein. The fluid low pressure regulating chamber is divided into first and second sub-chambers by a first flexible diaphragm. Each sub-chamber has a fluid inlet. A fluid high pressure regulating chamber is disposed within the housing, and includes a fluid passageway intermediate an inlet and an outlet thereof. The fluid high pressure regulating chamber is at least partially defined by a second flexible diaphragm. An atmospheric chamber is disposed between the fluid low pressure regulating chamber and the fluid high pressure regulating chamber. A poppet is slidably disposed within the atmospheric chamber. A stem extends from the first flexible diaphragm into the atmospheric chamber and is movable into contact with the poppet. Movement of the poppet by either the stem, or the second flexible diaphragm, due to fluid pressure variations in the high fluid pressure regulating chamber or the low pressure regulating chamber varies fluid flow between the inlet and outlet of the fluid high pressure regulating chamber. This alters the fluid pressure in the control chamber of the main valve, so as to hydraulically open or close the main valve member.

The first flexible diaphragm is selectively biased with a first spring. The first spring is selectively adjustable to limit the movement of the stem to a selected range defining a lower pressure set point. Similarly, the second flexible diaphragm is selectively biased with the second spring. The second spring is selectively adjustable to limit the movement of the poppet to a selected range defining an upper pressure set point.

A pressure regulator apparatus may be disposed between the fluid conduit inlet and the fluid inlet of the variable orifice assembly to customize and regulate the pressure entering into the variable orifice assembly. The pressure regulator comprises a housing having a fluid inlet and a fluid outlet. A selectively adjustable fluid passageway is disposed between the fluid inlet and fluid outlet.

In accordance with the present invention, a method for controlling fluid pressure downstream a main valve comprises the steps of providing a main valve having a fluid inlet and a fluid outlet. The main valve is configured to open to increase fluid flow therethrough, and close to reduce fluid flow therethrough. A variable orifice is associated with the main valve such that the variable orifice opens as the main valve is opened and closes as the main valve is closed. A fluid stream, having a pressure substantially matching a fluid inlet pressure of the main valve, is passed to an inlet of the variable orifice. An inlet of a fixed orifice is placed in fluid communication with an outlet of the variable orifice. A pressure differential between the inlet and outlet of the fixed orifice is detected, and the main valve is opened or closed in response to the detected fixed orifice pressure differential.

In a particularly preferred embodiment, the main valve is opened or closed hydraulically. This is done by means of a control pilot valve apparatus in fluid communication with the variable orifice, the fixed orifice, and the main valve. The control pilot valve apparatus detects the pressure differential between the inlet and outlet of the fixed orifice, and hydraulically opens or closes the main valve.

In one embodiment, a first portion of the fluid stream exiting the outlet of the variable orifice is passed to a first chamber of a low pressure control chamber of the pilot valve apparatus. A second portion of the fluid stream exiting from the outlet of the fixed orifice is passed to a second chamber of the low pressure control chamber of the pilot valve apparatus. The first and second chambers have a first flexible diaphragm therebetween.

A second fluid stream is generated which has a pressure substantially equal to the fluid inlet pressure of the main valve. A first portion of the second stream is passed through a first chamber of a high pressure chamber of the control pilot valve apparatus, which is at least partially defined by a second flexible diaphragm. The first portion of the second stream is passed through a variable valve, into a second chamber and subsequently an outlet of the high pressure chamber. A second portion of the second stream is passed through a hydraulic control chamber of the main valve.

The variable valve of the high pressure chamber is opened or closed in response to detected pressures within the high pressure chamber and low pressure chamber. The main valve is hydraulically opened by lessening the second portion of the second stream as the variable valve of the high pressure chamber is opened. The main valve is hydraulically closed by increasing the second portion of the second stream as the variable valve of the high pressure chamber is closed.

An upper pressure set point and a lower pressure set point are set. The lower pressure set point is set by selectively limiting a range of travel of the first flexible diaphragm. An upper pressure set point is set by selectively limiting a range of travel of the second flexible diaphragm.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 12 is an enlarged cross-sectional view of area "12" of FIG. 11, illustrating a variable orifice thereof in a closed position;

FIG. 13 is a cross-sectional view of the variable orifice assembly of FIG. 4, but illustrating the variable orifice in a closed position;

DETAILED DESCRIPTION OF THE PREFERRED EMBODIMENTS

Figure 1:
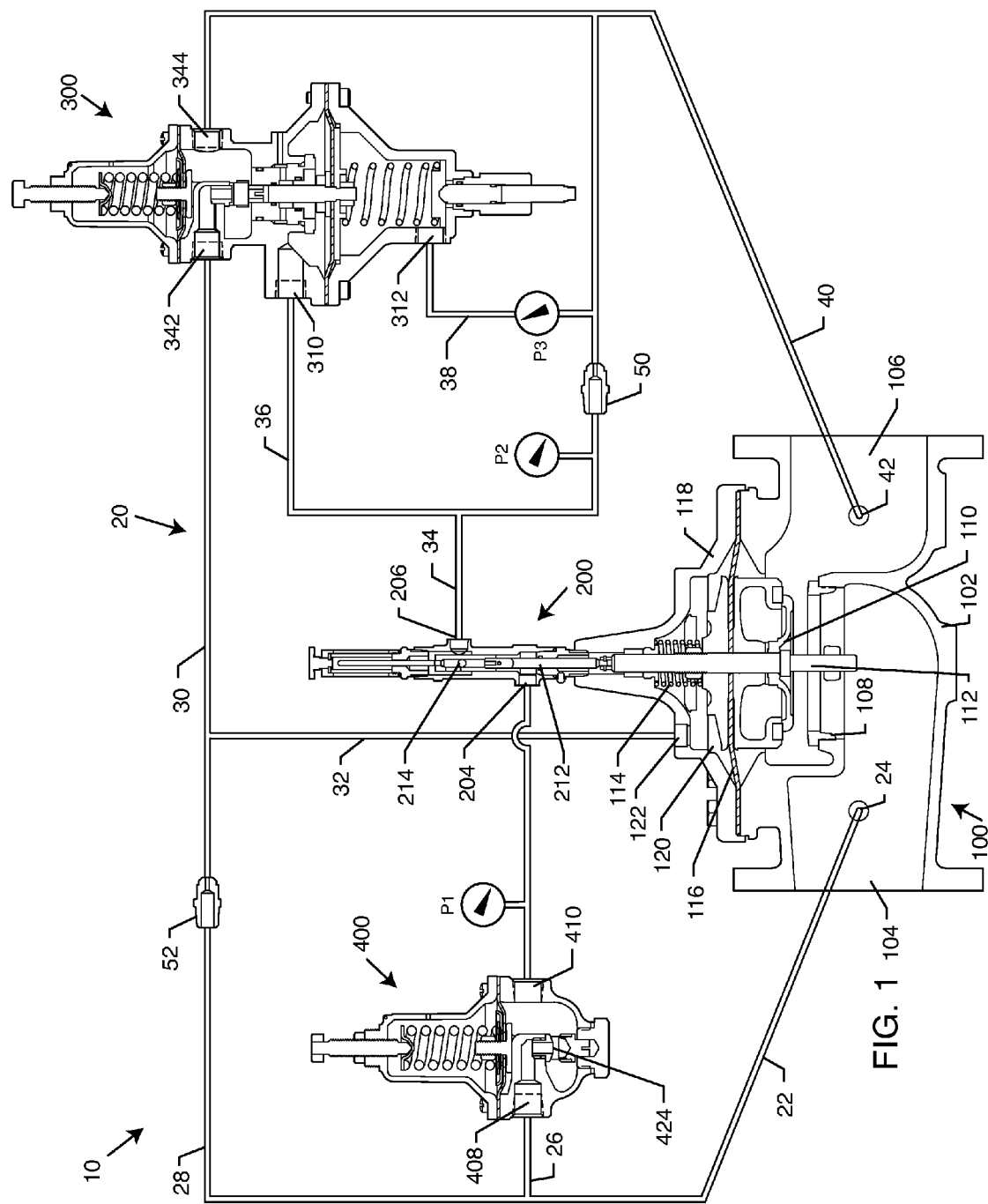
FIG. 1 is a schematic illustration of a system in a high fluid flow state for hydraulically managing fluid pressure downstream of a main valve between selected set points, in accordance with the present invention.

As shown in the accompanying drawings, for purposes of illustration, the present invention is directed to an adjustable hydraulically operated pressure management control valve system 10. As will be more fully described herein, the system 10 of the present invention is primarily intended for use in the waterworks industry where there is a desire to reduce the amount of water loss in the system due to leaks. The invention can reduce the amount of water loss in a system by reducing the system pressure as the flow or system demand decreases. A common example would be a residential water system where water demand is high during the day and low at night. If the pressure is lower during low usage, then a lower pressure will result in lower water losses throughout the system.

As will be more fully described herein, the system 10 of the present invention comprises a main valve assembly 100 operably coupled to a pilot control system 20. The pilot control system 20 includes a variable orifice assembly 200, a control device in the form of a pilot valve apparatus 300, and an optional pressure regulator apparatus 400. Various conduits 22-42 fluidly couple these components and provide pressurized fluid streams, as will be more fully described herein. The pilot control system 20 hydraulically opens the main valve assembly 100 during high demand conditions, and closes the main valve assembly 100 during low demand conditions, resulting in a reduction of the amount of water loss in a waterworks system downstream of the main valve assembly 100.

Figure 2:
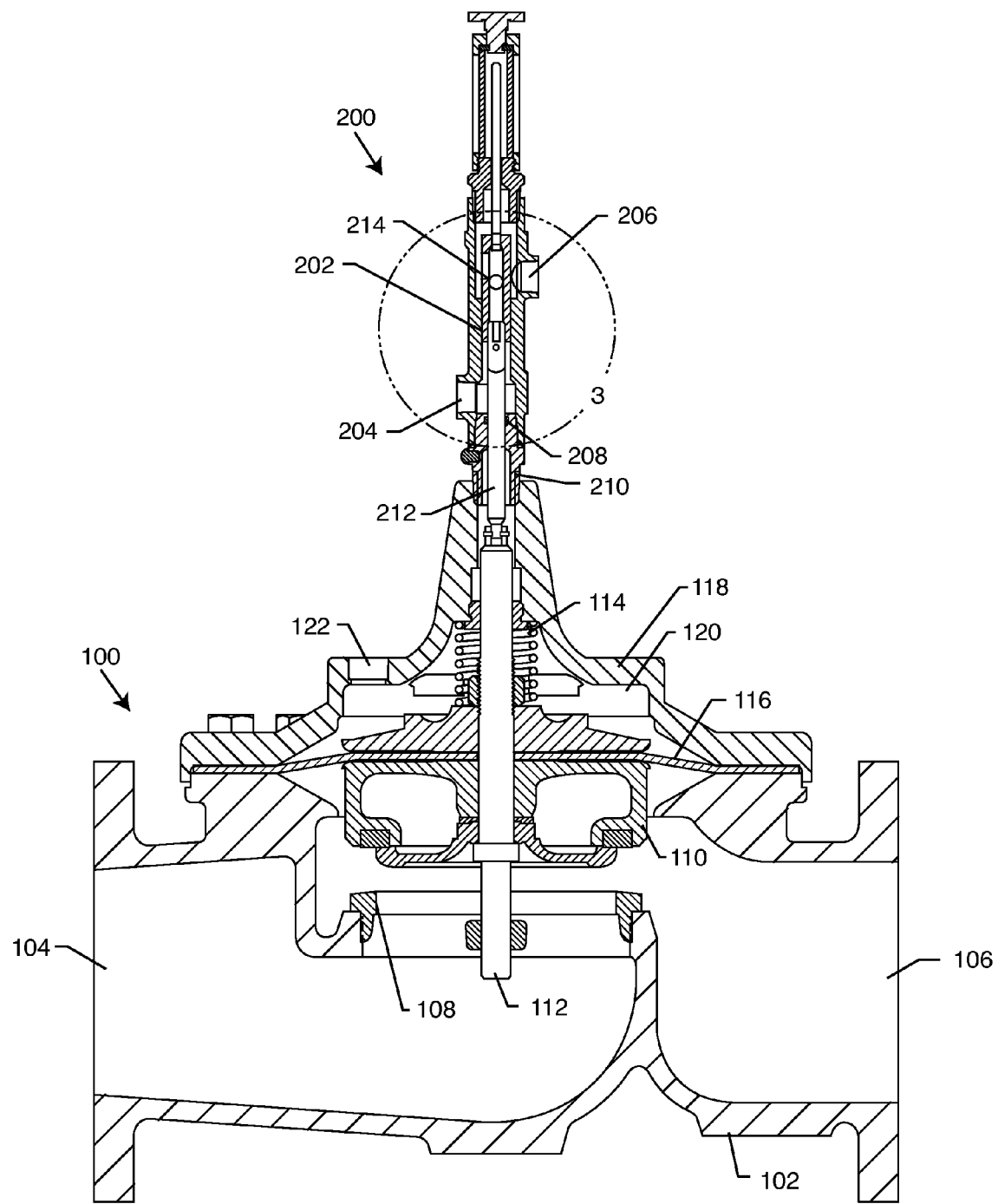
FIG. 2 is a cross-sectional view of a main valve and a variable orifice assembly positioned in a high flow state, in accordance with the present invention.

With reference now to FIGS. 1 and 2, the main valve 100 is comprised of a main valve body 102 defining an inlet 104 and an outlet 106. Intermediate the main valve inlet and outlet 104 and 106 is a main valve seat 108. A main valve member is movable between an open position away from the main valve seat 108, as illustrated in FIG. 1, and a closed position engaging the main valve seat 108. The main valve member 110 includes a movable stem 112 for guiding the main valve member 110 into and out of engagement with the main valve seat 108. A spring 114 is typically also implemented in facilitating and guiding the main valve member 110 movement. A main valve diaphragm 116 is coupled to the main valve member 110 and extends between the main valve body 102 and a cover 118 of the main valve 100 so as to define a fluid control chamber 120 between the diaphragm 116 and the cover 118, or other portion of the body 102. The control chamber includes an inlet port 122 for fluid coupling with the pilot control system 20, such as through conduit 32.

As will be more fully explained herein, the pilot control system 20 increases fluid flow into the control chamber 120 during low flow or low demand situations, causing the main valve member 110 to move downwardly towards engagement with the main valve seat 108. Conversely, during high flow or high demand situations, less fluid is directed into the fluid control chamber 120, resulting in a lower pressure and enabling the main valve member 110 to move away from the main valve seat 108 into an open position so as to permit more fluid to flow through the main valve 100.

With reference again to FIG. 1, conduit 22 has an inlet 24 disposed upstream of the main valve seat 108 and main valve member 110, typically adjacent to the inlet 104 of the main valve assembly 100. A fluid stream having a pressure proportional to the fluid stream at the inlet 104 of the main valve 100 is thus generated in the conduit 22. A portion of the fluid stream is diverted into conduit 26 and through the variable orifice assembly 200. As will be more fully described below, the portion of the fluid stream passing through conduit 26 may first pass through a pressure regulator device 400 so as to control the profile of the pressure regulation ramp and maintain pressure stability to the inlet 200 when regulating between low and high pressure set points.

With reference now to FIG. 2, in one embodiment the variable orifice assembly 200 includes a housing 202 defining a fluid inlet 204 and a fluid outlet 206. Typically, the housing 202 is coupled to the main valve cover 118, as illustrated. However, fluid pressures within the variable orifice assembly housing 200 and the main valve 100 are isolated from one another, such as by utilizing an O-ring 208 in an adapter 210 which isolate the pressure within the housing 202 and the main valve control chamber 120.

Figure 3:
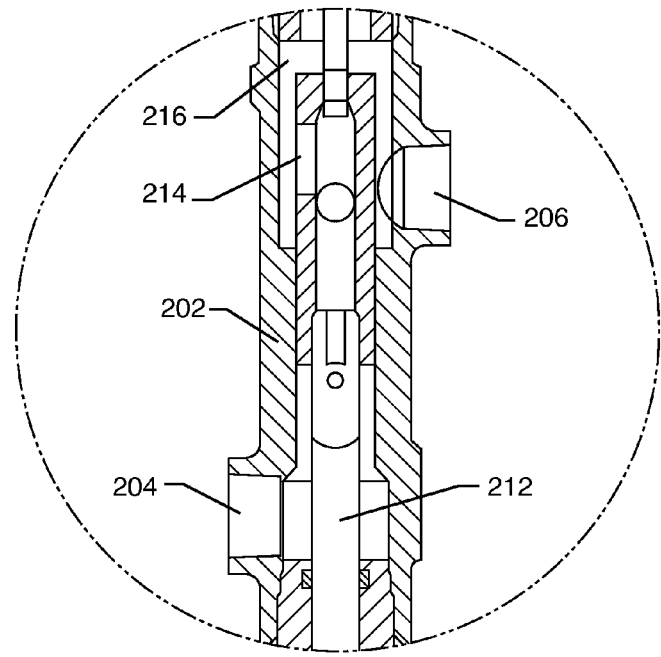
FIG. 3 is an enlarged cross-sectional view of area "3" of FIG. 2, illustrating a variable orifice thereof in an open position.

A stem 212 is movably disposed within the housing 202, and engagable with the stem 112 of the main valve member 110. In this manner, as the main valve member 110 moves up and down, the stem 212 of the variable orifice assembly 200 also moves up and down. The housing 202 and the stem 212 cooperatively define a variable orifice 214. For example, typically the stem 212 is at least partially hollow and includes an aperture or slit therein. As illustrated in FIG. 3, when the stem 212 is raised upwardly by the stem 112, the variable orifice 214 is in fluid communication with the outlet 206, such as by an intermediate chamber 216.

Figure 4:
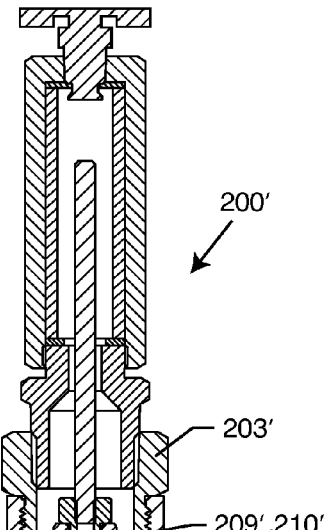
FIG. 4 is a cross-sectional view of an alternative variable orifice assembly embodying the present invention.

With reference now to FIG. 4, an alternative variable orifice assembly 200' is shown which is capable of being adjusted so as to customize a pressure regulation curve, between set points, to set the application preferences of the user. In this embodiment, the assembly 200' also includes a housing 202' which is connected to the main valve member, typically the cover member 118, such as by threaded connection 201'. A stem 212' is connected to the main valve member stem 112, as discussed above, and includes an adapter 210' with an O-ring 208' to create a leak-free connection so as to separate pressures therebetween. The housing 202' includes a fluid inlet 204' and a fluid outlet 206'.

Figure 5:
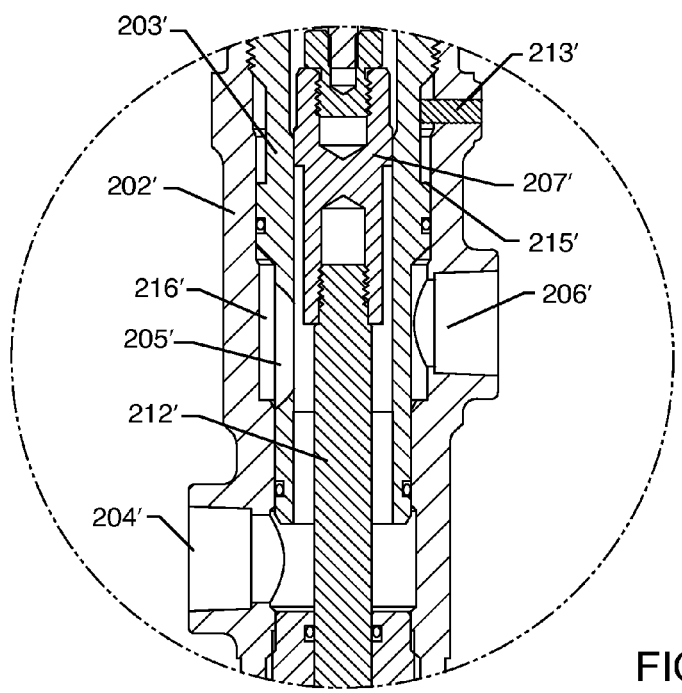
FIG. 5 is an enlarged cross-sectional view taken generally along area "5" of FIG. 4, illustrating the variable orifice in an open position.

In this case, however, the stem is not hollow. Instead, the housing 202' is adapted so as to receive a sleeve 203' between the inner wall of the housing 202' and the stem 212'. As illustrated in FIGS. 4 and 5, the sleeve 203' includes an aperture, typically in the form of a slit 205', which is in fluid communication with an intermediate chamber 216' of the housing 202', which is in fluid communication with the outlet 206'. A section 207' of the stem is configured so as to have a greater diameter towards an upper portion thereof, or a shoulder which may include an O-ring or the like, and be of reduced diameter, or include external passageways or the like, in a lower portion thereof such that when the stem 212' is raised sufficiently, the reduced diameter profile of the section 207' is in alignment with the slot 205' of the sleeve 203', permitting fluid to flow from the housing inlet 204', around the stem section 207', through the sleeve slot 205', into the intermediary chamber 216', and out outlet 206'.

It will be readily appreciated by those skilled in the art that the slot 205' can be created so as to create a pressure regulation profile by increasing or decreasing the fluid flow therethrough. Similarly, the exterior configuration of the stem section 207' can be modified to correlate to increased or decreased fluid flow. However, these techniques do not allow adjustment after the assembly 200' has been manufactured and assembled.

Thus, with reference to FIGS. 4, 5 and 13, the sleeve 203' is adjustably inserted and connected to the housing 202', such as by threaded connection between the internal threads 209' and external threads 211' of the housing 202' and sleeve 203', respectively. This allows the sleeve 203' to be raised or lowered, thus adjusting the position of the sleeve slot 205', and thus requiring a greater or lesser stroke of the main valve stem 112 so as to open or close the variable orifice between the variable orifice assembly inlet 204' and outlet 206'.

The travel of the sleeve 203' may be limited, for example, by the use of a set screw 213' which is disposed above a shoulder 215' of the sleeve 203'. Also, this serves as a precautionary feature so as to not permit the user to inadvertently unthread the sleeve 203' to the point where the variable orifice assembly 200' does not function. It will be appreciated that the adjusting position of the sleeve aperture 205' can be used to change or customize the pressure curve profile between the low and high flow set points of the system.

Those skilled in the art will appreciate that the foregoing descriptions and illustrations for the variable orifice assembly 200 and 200' are preferred embodiments for illustration and explanatory purposes. The important aspect of the variable orifice assembly is that a variable orifice is created which varies in relation to the stroke of the main valve member 110 such that as the main valve member 110 is moved up and down, the variable orifice is altered such that it opens and closes. The fluid output of the variable orifice assembly drives a pressure differential which is detected by a control device 300, typically a pilot control apparatus, which limits and controls the opening and closing of the main valve member 110.

With reference again to FIG. 1, when the stem 212 of the variable orifice assembly 200 is raised, such as during high flow or high demand situations, so as to open the variable orifice and permit fluid to flow therethrough, the fluid passes into conduit 34 and is split such that a portion of the fluid is passed through a fixed orifice device 50 through conduit 38 which is fluidly coupled to the control pilot valve apparatus 300, and another portion is passed through conduit 36 and into the control pilot valve apparatus 300.

Figure 6:
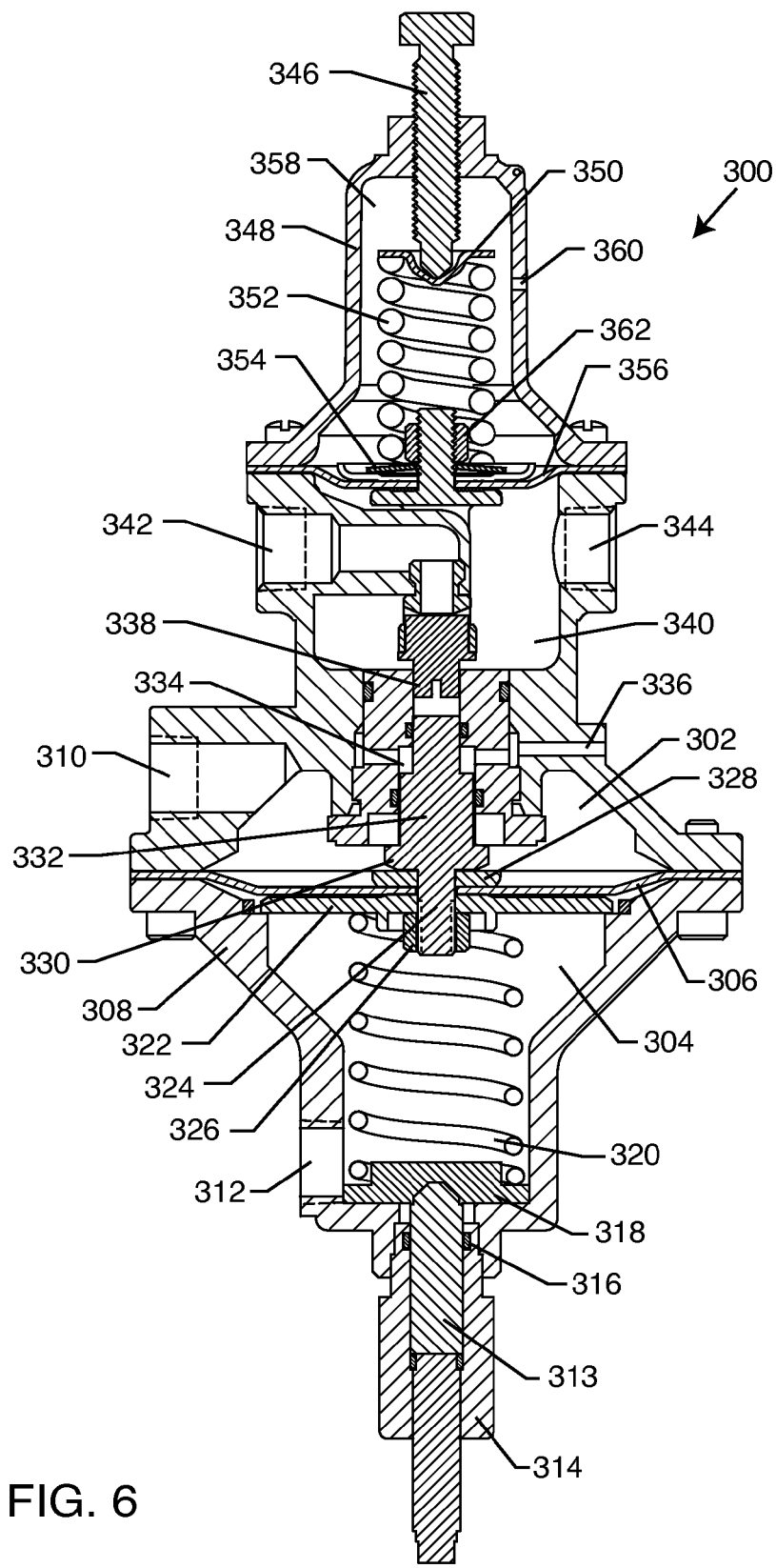
FIG. 6 is a cross-sectional view of a control pilot valve apparatus used in accordance with the present invention, in a high flow state.

More particularly, with reference to FIG. 6, the control pilot valve apparatus 300 includes a first, as illustrated an upper, low pressure regulating chamber 302 and a second or lower low pressure regulating chamber 304. These chambers 302 and 304 are separated by a flexible diaphragm 306. The flexible diaphragm 306 extends across the housing 308 and divides the first and second low pressure control chambers 302 and 304. A fluid inlet port 310 fluidly connects conduit 36, from the opening of the fixed orifice 50 or the outlet 206 of the variable orifice assembly 200 to the first low pressure chamber 302. Inlet port 312 fluidly connects conduit 38, from the outlet of the fixed orifice 50 to the second or lower low pressure regulating chamber 304. It will be appreciated by those skilled in the art that there can exist pressure differentials between chambers 302 and 304, resulting in the movement of the flexible diaphragm 306.

The control pilot valve apparatus 300 includes a low pressure adjustment screw 313 threadedly connected to an end member 314. Typically, an O-ring 316 or the like is used to maintain a fluid seal in the second pressure chamber 304. The end of the screw 313 engages a guide 318, supporting a spring 320. The spring is contained within a piston 322 such that the spring 320 exerts a force on the piston 322.

A stem 324 is connected to the piston 322, such as by use of a nut 326 and a threaded end of the stem 324 extending into the body of the piston 322. The stem 324 also extends through the diaphragm 306 and a washer 328 disposed on a top surface of the diaphragm 306. If any of these components are moved, such as due to the force of the spring 320 or the fluid pressure differentials between chambers 302 and 304, the connected members also move. With reference to FIG. 6, it can be seen that a lower portion 330 of the stem 324 is of an increased diameter with respect to an upper portion 332 of the stem 324. The enlarged diameter of the lower portion with respect to the upper portion allows the pressure force in the first low pressure regulating chamber 302 to be greater than the pressure force in the second low pressure regulating chamber 304.

With continuing reference to FIG. 6, it can also be seen that the upper portion 332 of the stem 324 is at least partially disposed within an atmospheric chamber 334, having a vent 336 to the atmosphere. This atmospheric chamber 334 facilitates the movement of the stem 324 therein, so as to come into contact with a control poppet 338.

The control device 300, illustrated in a preferred embodiment as a control pilot valve apparatus, includes a high pressure regulating chamber 340 having an inlet port 342 and an outlet port 344, defining a fluid passageway therethrough which is opened and closed or constricted depending upon the position of the control poppet 338.

A high pressure adjustment screw 346 threadedly extends through an upper member 348 of the body. The end of the high pressure adjustment screw 346 is in contact with an upper spring guide 350 which acts upon an upper spring 352. The spring 352 extends between the upper guide 350 and a washer 354 coupled to an upper, and typically smaller, diaphragm 356. The upper diaphragm 356 is disposed between the high pressure regulating chamber 340, and a chamber 358 having atmospheric pressure with a vent 360 to the atmosphere. The control poppet 338 has a threaded end which extends through the upper flexible diaphragm 356 and washer or retaining member 354, and is held in place and coupled to these components by means of a nut 362. Thus, as the control poppet 338 is moved, the diaphragm 356 and spring 352 are also moved, and vice versa.

With reference again to FIG. 1, a high demand or high flow situation is illustrated. A fluid stream is generated through inlet 24, and passed through conduit 22. A portion of the stream is passed through conduit 28, through fixed orifice device 52. From there, this portion of the stream is fluidly coupled through conduits 30 and 32 to inlet 342 of the control pilot valve apparatus 300 and the control chamber 120 of the main valve 100. Another portion of the fluid stream is directed through conduit 26 and into the inlet port 204 of the variable orifice assembly 200. In the high flow/high demand situation, the main valve seat 110 is opened and moved away from the valve seat 108. Thus, as the stem 112 of the main valve 100 is moved upwardly, the stem 212 of the variable orifice assembly 200 is moved as well, exposing to an increasing level the variable orifice 214 until the variable orifice 214 presents a maximum passageway for fluid to flow therethrough, out outlet 206, and into conduit 34.

The fluid stream exiting the variable orifice assembly 200 in conduit 34 passes through a fixed orifice device 50. Conduit 36 is fluidly coupled to the inlet of the fixed orifice device 50 and the inlet port 310 of the first low pressure regulating chamber 302. Conduit 38 is fluidly connected to the outlet of the fixed orifice device 50 and the inlet port 312 of the second low pressure regulating chamber 304. As can be seen in FIG. 1, during high flow conditions, there is an increased pressure P2 at the inlet of the fixed orifice device 50 as compared to the pressure P3 at the outlet of the fixed orifice device 50. This pressure differential is detected within the control device 300, wherein the increased pressure in the first low pressure regulating chamber 302 is higher than the pressure in the second low pressure regulating chamber 304, causing the diaphragm 306 to move downwardly against the bias of spring 320. This causes the stem 324 to move downwardly as well, so as to be in spaced relation and out of contact with the control poppet 338.

The bias of spring 352 moves the control poppet 338 downwardly, or into a fully open position such that the fluid flow between inlet port 342 and outlet port 344 is at its greatest flow.

Due to the relatively free flow of the fluid, as described above, a relatively lesser amount of fluid and fluid pressure is introduced into the control chamber 120 of the main valve 100, permitting the main valve member 110 to be moved upwardly towards the main valve cover 118. It will be noted that in this situation, the pressure at P2 is greater than the pressure at P3 at the other side of fixed orifice device 50. This is due to a relatively high flow of fluid through variable orifice 214 and into the first low pressure regulating chamber 302 of the control pilot valve apparatus 300. Such would be the case, for example, when a large flow is required downstream from the main valve assembly 100.

As explained above, the design of the present invention controls high and low pressures by interacting with the variable orifice 214 or the variable orifice assembly 200 operably coupled to the main valve assembly 100. The variable orifice 214 opening increases or decreases with the main valve member 110 stroke upwardly or downwardly. The variable orifice 214 interacts with the fixed orifice 50 in the control pilot system 20. As system demand increases, the main valve 100 opens to respond to the increased system demand. As the main valve 100 opens, the flow area through the variable orifice 214 increases, which in turn increases the pressure drop, or pressure differential, across the fixed orifice device 50. The pressure drop, or differential, across this fixed orifice 50 is used to control the transition of system downstream pressure between the low and high pressure set points of the control pilot valve apparatus 300.

In the illustrated design, the low pressure set point is set and adjusted by turning screw 313, which serves to compress or decompress spring 320, thus limiting the range of motion or travel of the lower diaphragm 306 and stem 324. The upper or high pressure adjustment is made by selectively turning screw 346, thus compressing or decompressing spring 352, and thus affecting the range of travel of the upper diaphragm 356 and the control poppet 338. Such adjustments set the low and high pressure set points of the system 10.

The variable orifice 214 can be customized to control the rate of change between the low and high pressure settings. If the flow area through the variable orifice 214 is profiled to increase quickly (relative to main valve member 110 stroke), the transition between low and high pressure set points will likewise change quickly. For example, for a variable orifice 214 where the flow area through the variable orifice quickly changes, the transition between the low pressure set point and the high pressure set point would occur fairly quickly between the low and high flow conditions resulting in a relatively steep curve between the low and high set points. For instance, for a given valve size, such as an eight-inch valve, pressure change could occur within a two hundred gallon-per-minute flow span, or a relatively steep curve. However, if the flow area through the variable orifice 214 is profiled to increase slowly, relative to main valve member 110 stroke, then the transition between the low and high pressure set points will likewise change slowly. For example, a variable orifice 214 where the flow area through the variable orifice slowly changes, then the same low-high pressure transition would occur fairly slowly between the low and high flow conditions. In this case, the change might occur within a five hundred gallon-per-minute flow span, or a relatively shallow curve. Changing the variable flow area geometry of the variable orifice 214 can be used to change or customize the pressure curve profile between the low and high flow set points.

Figure 7:
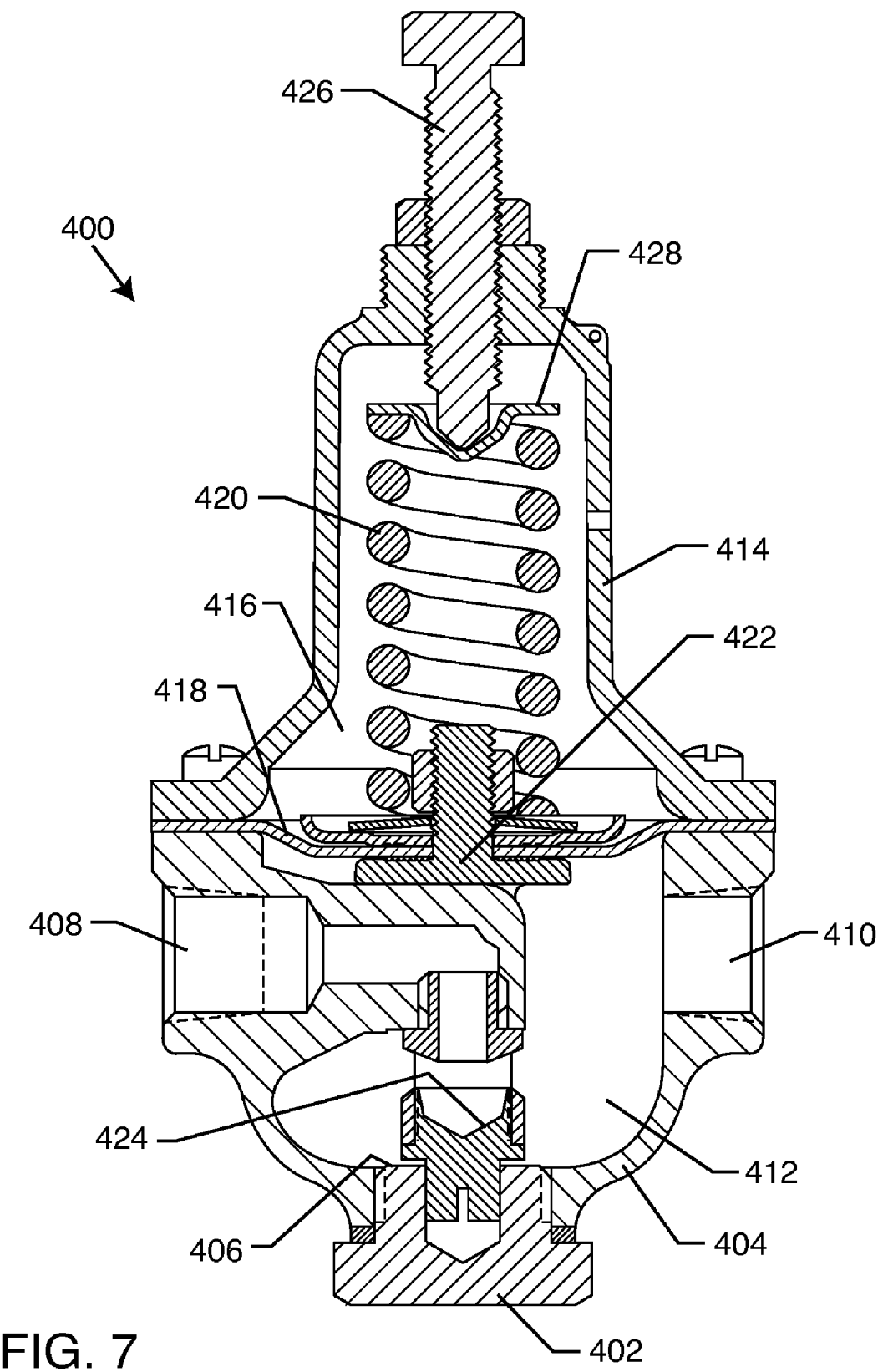
FIG. 7 is a cross-sectional view of a pressure regulator apparatus used in accordance with the present invention.

With reference now to FIGS. 1 and 7, as mentioned above, fluid stream through conduit 26 may be passed through pressure regulator apparatus 400 before being passed into the variable orifice assembly 200. The pressure regulator apparatus 400 is another means of customizing and controlling the rate of change between the low and high pressure settings, so as to change or customize the pressure curve profile between the low and high flow set points. The pressure regulator apparatus generally comprises a plug 402 connected to a seat assembly or body 404, and supporting a disc retainer assembly 406. The body 404 defines an inlet 408 and an outlet 410. A chamber or passageway 412 is disposed between the inlet and outlet 408 and 410. A cover or upper body 414 defines a chamber 416, typically exposed to atmosphere. A diaphragm 418 is disposed between chambers 412 and 416. The diaphragm 418 is operably connected or coupled to a spring 420 and a yoke 422. A portion of the yoke defines a passageway 424 alignable with a passageway of the inlet 408, so as to permit fluid to flow therethrough. However, depending upon the position of the yoke 422, the fluid is either allowed to pass through into passageway or chamber 412, and out outlet 410, or is restricted or even closed from passing into passageway or chamber 412.

The set point or adjustment is made by a screw 426 being turned clockwise or counterclockwise, which applies a force to spring guide 428, causing the spring 420 to be compressed or relaxed. This impacts the position of diaphragm 418, and yoke 422. This also establishes a range of travel for the diaphragm 418, if any, so as to produce a relatively constant flow or pressure through outlet 410, represented by P1 in FIG. 1. The pressure regulator device 400 is used to control the pressure at P1. This in turn customizes the profile of a pressure regulation ramp when regulating between low and high pressure set points. When pressure at P1 is equal to, or nearly equal to, the pressure at the main valve inlet 104, then the pressure ramp is at its steepest. When the pressure at P1 is appreciably lower than the main valve inlet 104 pressure, then the pressure ramp is shallower.

Figure 8:
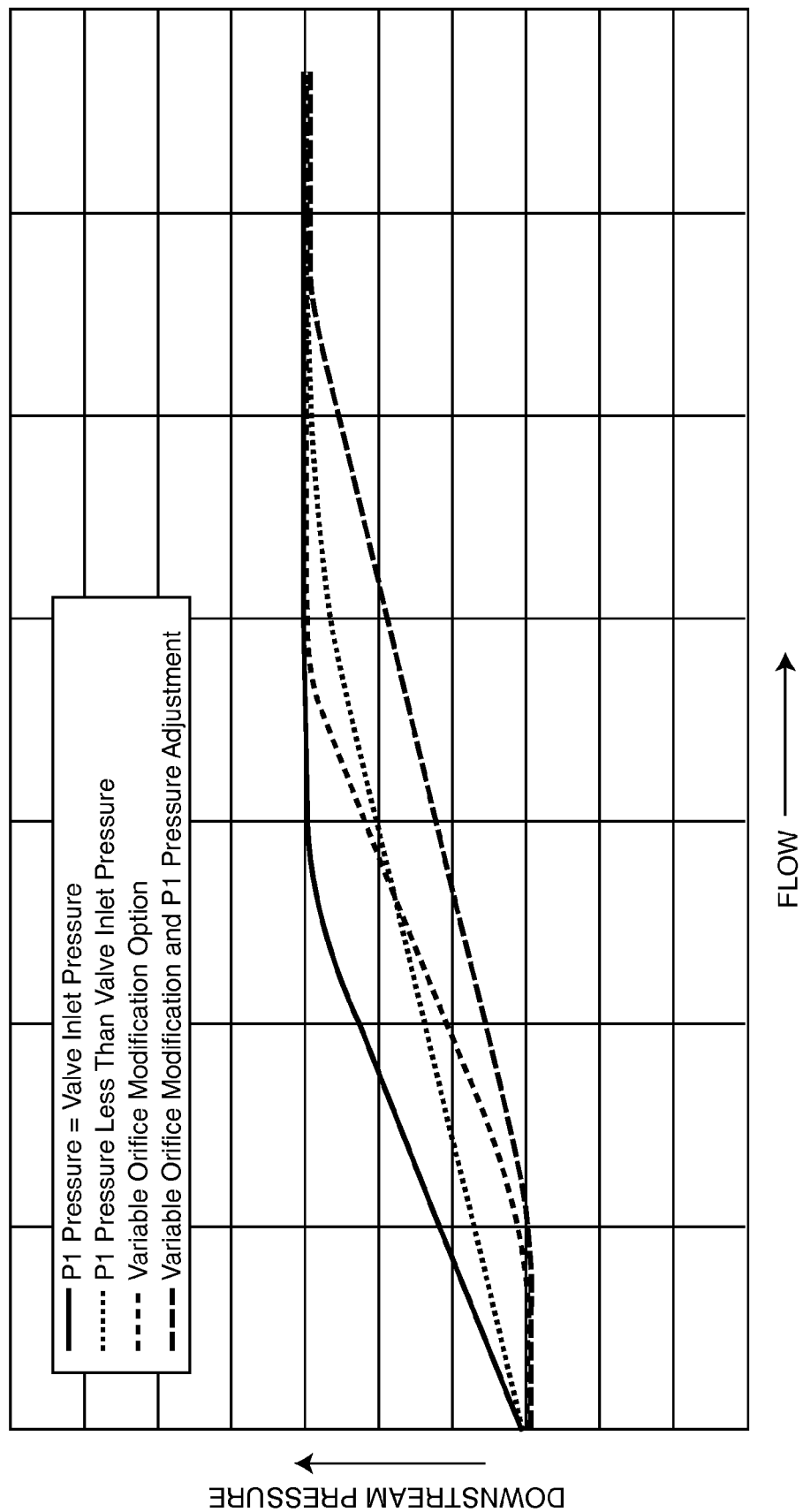
FIG. 8 is a diagram illustrating pressure profiles created by modifying the variable orifice assembly and implementing the pressure regulator apparatus.

With reference now to FIG. 8, a diagram illustrates the downstream pressure as compared to flow through the main valve 100. Thus, when the P1 pressure equals the main valve inlet pressure 104, a relatively steep curve, shown by the solid line results. When the pressure at P1 is less than the main valve inlet 104 pressure, illustrated by the dotted lines, a shallower curve or profile is created. This occurs due to the use of the pressure regulator apparatus 400. In FIG. 8, a pressure profile is illustrated wherein the variable orifice 214 is modified (illustrated by the dashed line). Including both the pressure regulator apparatus 400 as well as modifying the variable orifice 214 results in a relatively shallow profile, illustrated by the elongated dashed line.

Figure 9:
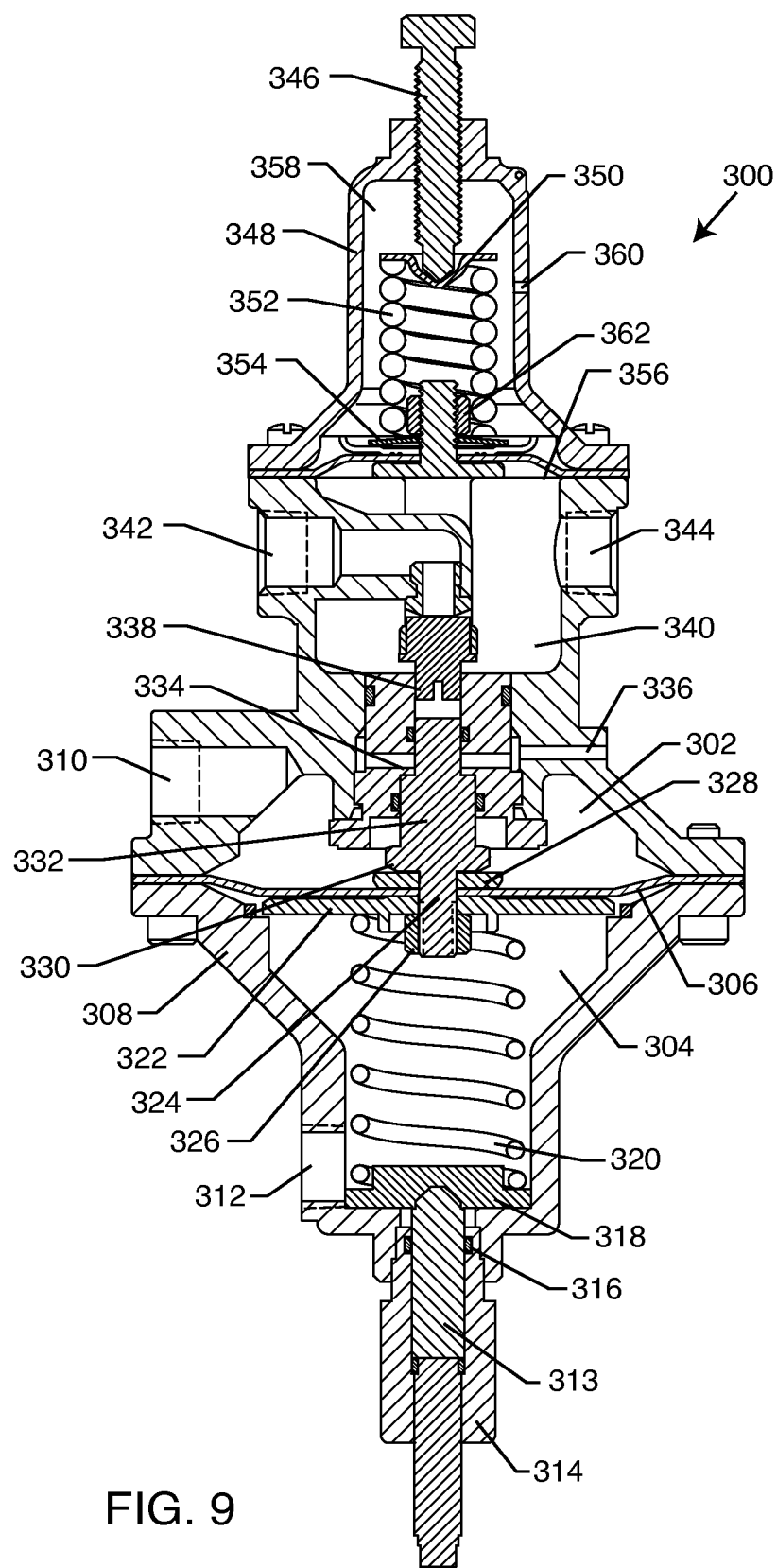
FIG. 9 is a cross-sectional view of the control pilot valve apparatus in a high pressure state.

Referring now to FIGS. 1 and 9, at some point during the high flow or high demand situation, the pressure at P3 will begin to increase, due to the pressure of the stream generated at inlet 42, and passed through conduit 40. In such a case, the pressure in high pressure regulating chamber 340 of the control pilot valve apparatus 300 will begin to increase. As the pressure in this chamber 340 begins to increase, the upper diaphragm 356 will be forced to move upwardly against the bias of spring 352, resulting in the control poppet 338 being moved upwardly as well. The upward movement of the control poppet 338 constricts the passageway and fluid flow between the inlet port 342 and outlet 344 of the chamber 340.

With reference again to FIG. 1, in such a scenario when the control poppet 338 is moved upwardly so as to constrict the fluid flow through the high pressure chamber 340, a build-up in fluid pressure begins to occur in conduits 30 and 32, which increases the fluid pressure in control chamber 120, forcing the main valve member 110 to close and move towards the main valve seat 108. This in turn affects the fluid flow through the variable orifice assembly 200, which will impact the pressure differential P2 and P3 across fixed orifice 50. Thus, the pressure and flow in the system is controlled between the low pressure and high pressure set points. As described above, adjustment screw 346 can be rotated so as to relax or compress spring 352, increasing or decreasing the range of potential motion in travel of the diaphragm 356 and the control poppet 338. In this manner, the high pressure set point can be adjusted and set to a predetermined level. Similarly, the set screw 313 can be adjusted to compress or relax spring 320 so as to adjust and set the low pressure set point to a predetermined level. The upper spring 352 is used to set the system pressure for normal or high flow conditions, and the lower spring 320 is used to set the system pressure conditions for low flow conditions.

Figure 10:
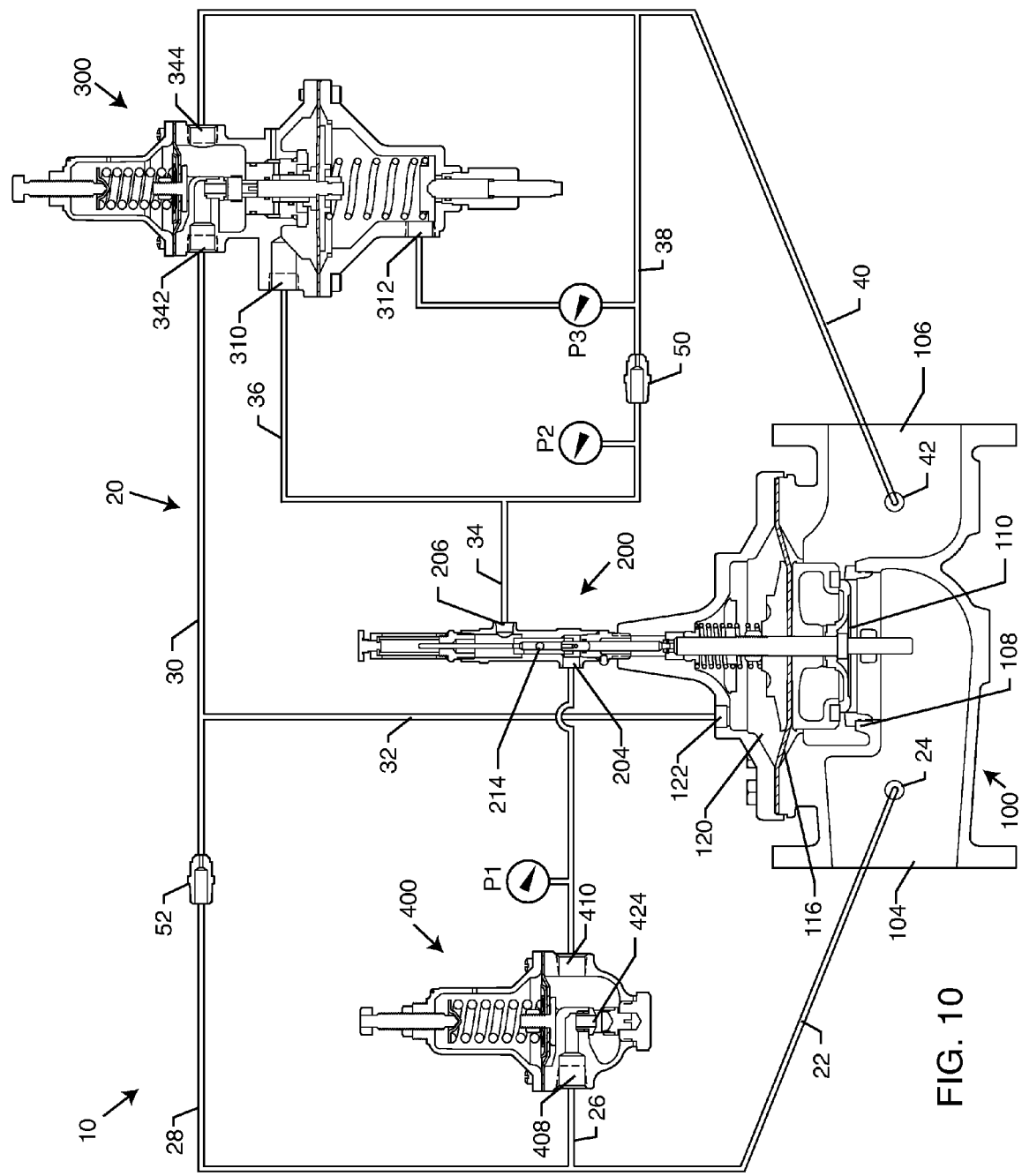
FIG. 10 is a schematic illustration of the system of the present invention in a low flow state.

With reference to FIG. 10, the system 10 is illustrated in a low flow or low demand state, wherein the main valve member 110 is moved towards the main valve seat 108, so that fluid flow through the main valve 100 is restricted, or there is a relatively low flow through the main valve assembly 100.

Figure 11:
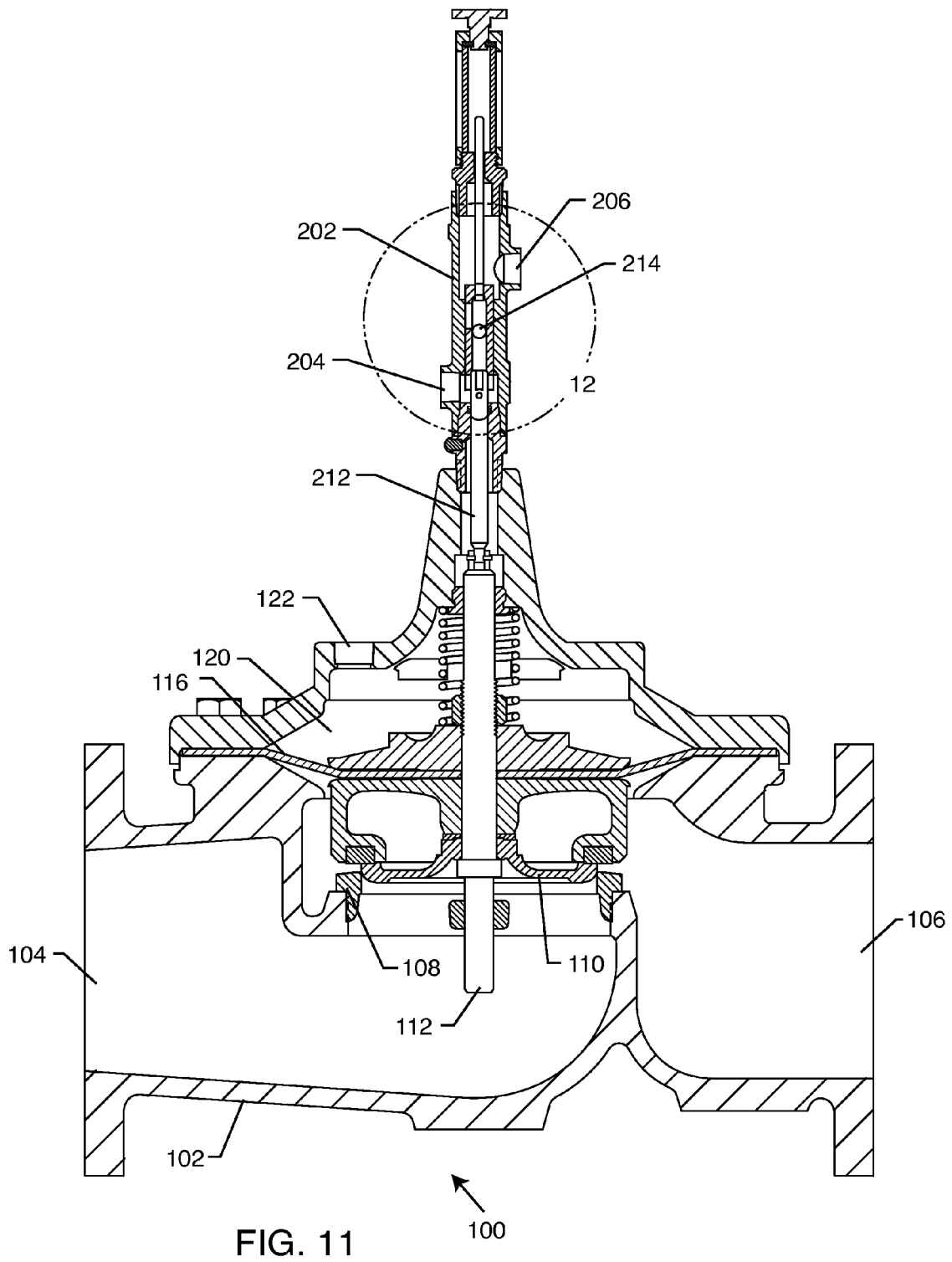
FIG. 11 is a cross-sectional view of the main valve and variable orifice assembly in the low flow state.

With reference now to FIG. 11, in such a low flow or low demand situation, the main valve member 110 moves towards its closed position adjacent to main valve seat 108. Thus, variable orifice assembly stem 212 is moved downwardly, occluding variable passage 214, limiting or restricting, or even preventing, fluid flow therethrough and out outlet 206. This can be seen in FIG. 12.

Figure 14:
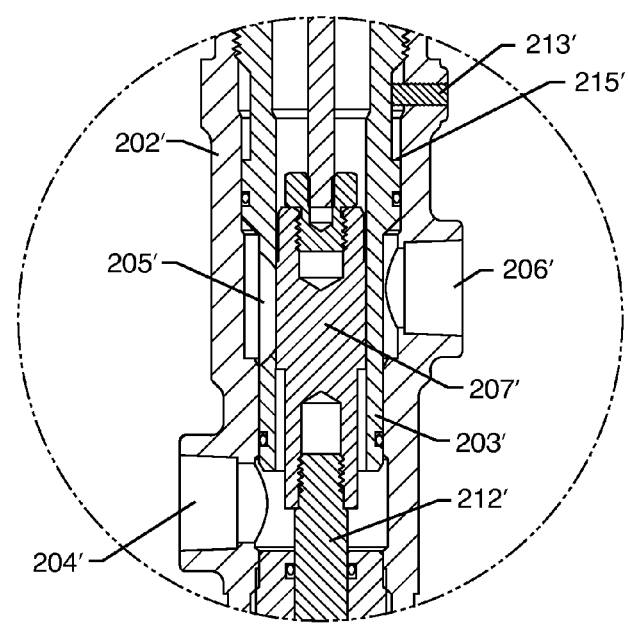
FIG. 14 is an enlarged cross-sectional view of area "14" of FIG. 13.
Figure 15:
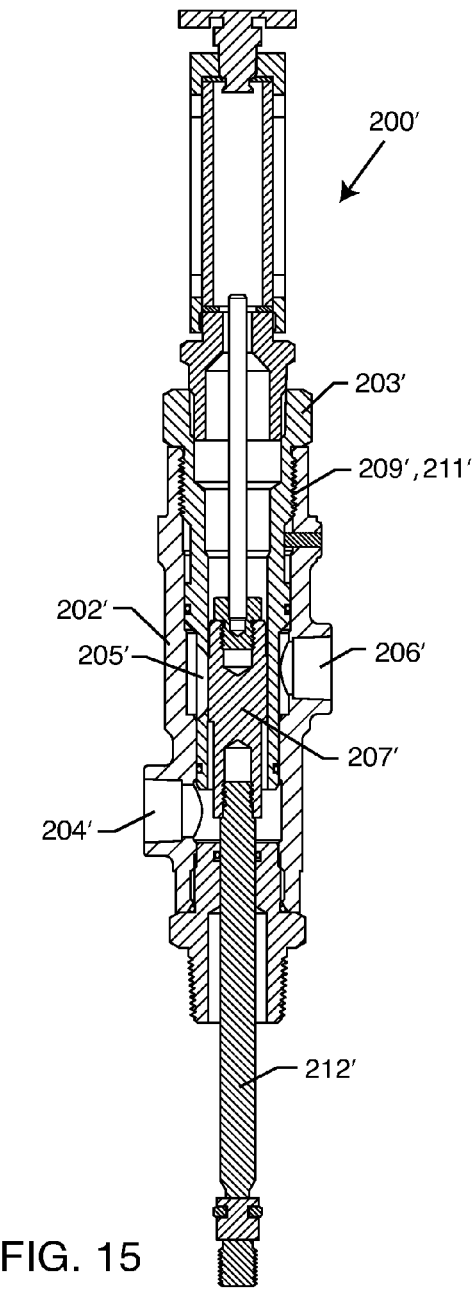
FIG. 15 is a cross-sectional view similar to FIG. 13, but illustrating a sleeve thereof moved into a different profile position.

With reference now to FIGS. 13-15, in the alternative embodiment of the variable orifice assembly 200', when the stem 212' is moved downwardly, section 207' is moved downwardly as well, such that the wider diameter portion of the section 207' is in contact with the sleeve 203', either reducing or preventing fluid flow from the assembly inlet 204' and the sleeve slot 205', and thus outlet 206'. It will be noted that the sleeve 203' has been adjustably moved when comparing the variable valve orifice assembly 200' illustrated in FIGS. 13 and 15. As discussed above, movement of the sleeve 203', either into or out of the housing 202', adjusts the position of the sleeve slot 205', and thus impacts the resulting fluid flow profile. However, in both FIGS. 13 and 15, the stem 212' has been moved downwardly sufficiently that there is little, if any, fluid flow from the housing inlet 204' to the outlet 206'.

Figure 16:
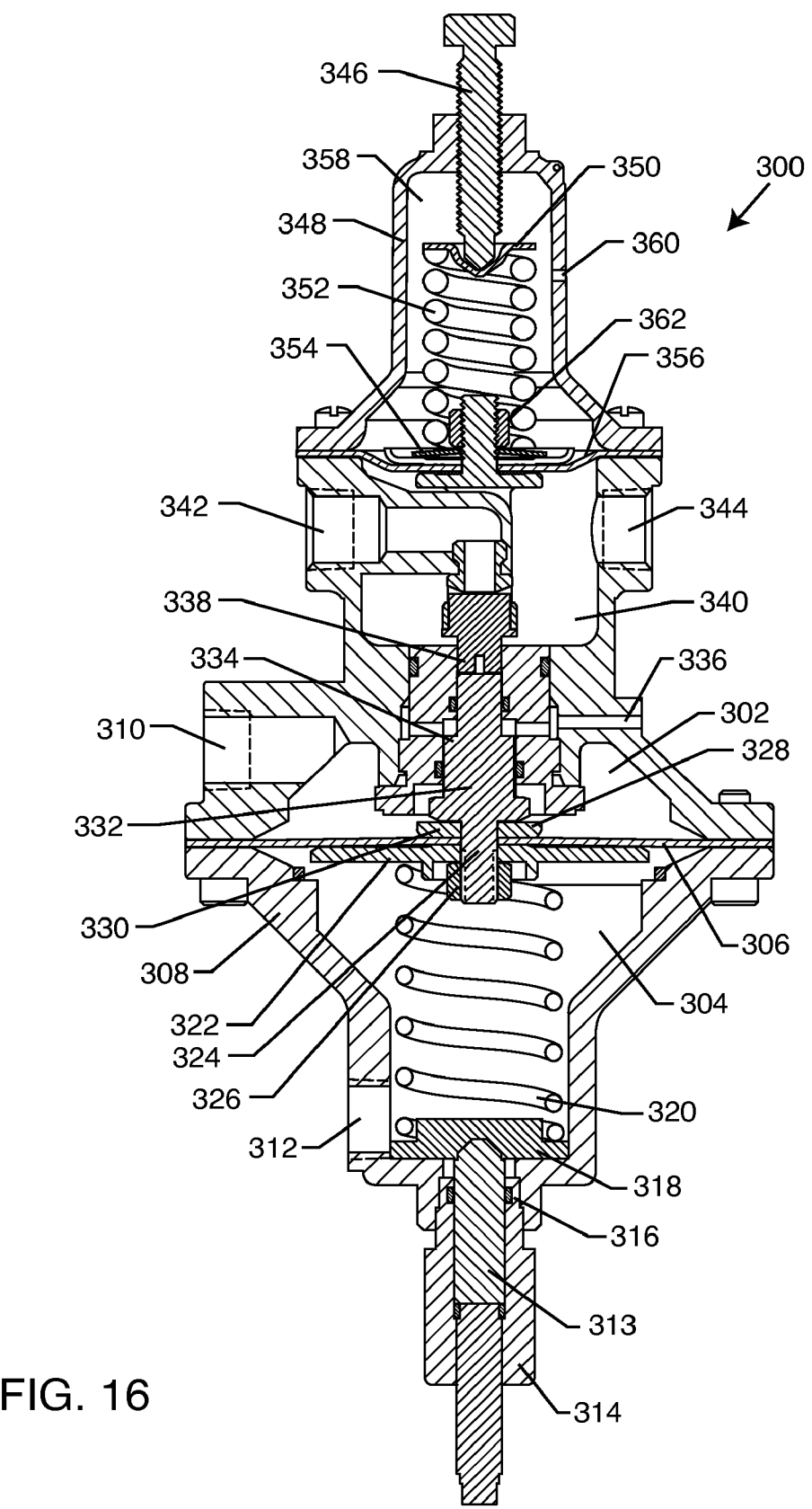
FIG. 16 is a cross-sectional view of the control pilot valve apparatus used in accordance with the present invention in a low flow state.

This results in a lower fluid flow to the inlet of fixed orifice 50, and thus a lower pressure at P2, and a lower fluid flow and pressure in the first low pressure regulating chamber 302. Thus, the pressure differential across fixed orifice 50 lessens, such that pressures at P2 and P3 are more balanced with one another. This results in a balancing of pressures between low pressure regulating chambers 302 and 304. Thus, the bias of spring 320 serves to push diaphragm 306 upwardly, as shown in FIG. 9. Movement of the diaphragm 306 causes the stem 324 to move upwardly as well and into contact with the control poppet 338, as illustrated in FIG. 16, moving the control poppet 338 upwardly so as to constrict the fluid flow through chamber 340.

This causes a back pressure, which increases in control chamber 120 of the main valve assembly 100, preventing the main valve member 110 from moving upwardly, or if sufficient pressure is present in control chamber 120, moving the main valve member 110 downwardly toward seat 108 to restrict the flow of fluid through the main valve 100.

The passage area through the variable orifice 214 changes with the change in the main valve member 110 position. Main valve number 110 position changes in response to system flow demand conditions, opening as demand increases and closing as demand decreases. Restricted flow through the variable orifice 214 causes a low pressure drop, or pressure differential, through the fixed orifice 50, which causes restricted flow through the control pilot valve apparatus 300. This action causes the main valve 100 to throttle closed towards a lower pressure set point. The lower pressure set point is established by adjusting set screw 312, which compresses or relaxes spring 320, directly affecting the range of travel and motion of lower diaphragm 306.

However, when system flow demand increases, the main valve 100 responds by opening, which increases flow area through the variable orifice 214, as described above. Increased flow through the variable orifice 214 increases the pressure drop, or differential, across fixed orifice 50. This action causes the main valve 100 to throttle open towards the higher set point, as described above.

Due to the varying flow of fluid through the variable orifice 214, the pressure acting on the lower diaphragm 306 also varies. As pressure above the diaphragm 306 in chamber 302 increases, it forces the diaphragm 306 downwardly, disengaging the stem 324 from the poppet 338, and allowing fluid to flow freely through the high pressure regulating chamber 340. This relatively free flow of fluid reduces the fluid pressure in chamber 120 of the main valve, permitting the main valve member 110 to remain open. However, when the pressure on the top of the diaphragm 306, in chamber 302, is equal to or slightly higher than the pressure under the diaphragm 306, in chamber 304, then hydraulic and spring forces bias the travel of the stem 324 upwardly so as to engage and move the control poppet 338 into a constricted or increasingly closed position. The fluid flow passageway between the inlet 342 and outlet 344 of the high pressure regulating chamber 340 varies with changing system conditions, causing flow to modulate. This action, as described above, causes the main valve 100 to throttle towards the low pressure, or low flow, set point. This arrangement allows the main valve 100 to modulate between the pre-selected high and low pressure set points established at the control pilot valve apparatus 300, as described above.

Although several embodiments have been described for purposes of illustration, various modifications may be made without departing from the scope and spirit of the invention. Accordingly, the invention is not to be limited, except as by the appended claims.

What is claimed is:

1. A control pilot valve apparatus, comprising:
   a housing;
   a fluid low pressure regulating chamber disposed within the housing, and divided into first and second sub-chambers, each having a fluid inlet, by a first flexible diaphragm;
   a fluid high pressure regulating chamber disposed within the housing, including a fluid passageway intermediate an inlet and an outlet thereof, and at least partially defined by a second flexible diaphragm;
   an atmospheric chamber disposed between the fluid low pressure regulating chamber and the fluid high pressure regulating chamber;
   a poppet slidably disposed within the atmospheric chamber; and
   a stem extending from the first flexible diaphragm into the atmospheric chamber and movable into contact with the poppet;
   wherein movement of the poppet by either the stem or the second flexible diaphragm due to fluid pressure variations in the high fluid pressure regulating chamber or the low pressure regulating chamber varies fluid flow between the inlet and the outlet of the fluid high pressure regulating chamber.

2. The apparatus of claim 1, wherein the first flexible diaphragm is selectively biased with a first spring.

3. The apparatus of claim 2, wherein the bias of the first spring is selectively adjustable to limit the movement of the stem to a selected range defining a lower pressure set point.

4. The apparatus of claim 1, wherein the second flexible diaphragm is selectively biased with a second spring.

5. The apparatus of claim 4, wherein the bias of the second spring is selectively adjustable to limit the movement of the poppet to a selected range defining an upper pressure set point.

* * * * *